May 5, 1964

H. T. MANN 3,132,046

METHOD FOR THE DEPOSITION OF THIN FILMS
BY ELECTRON BOMBARDMENT

Filed Sept. 28, 1960

HORACE T. MANN
INVENTOR.

BY Jerry A. Dinardo
AGENT.

Albert Rosen
ATTORNEY.

United States Patent Office 3,132,046

Patented May 5, 1964

3,132,046

METHOD FOR THE DEPOSITION OF THIN FILMS BY ELECTRON BOMBARDMENT

Horace T. Mann, Palos Verdes Estates, Calif., assignor to Space Technology Laboratories, Inc., Los Angeles, Calif., a corporation of Delaware Filed Sept. 28, 1960, Ser. No. 59,089
11 Claims. (Cl. 117—212)

This invention relates to the art of fabricating thin-film metal elements, and particularly to an improved method of precisely forming thin-film superconductive elements of a desired size and shape.

Thin-film superconductive elements are receiving increased attention in the design of high speed, miniaturized computers. A superconductive element, in its simplest form, consists of a body of superconductive material, usually in thin film form, disposed between a pair of terminals. One of the most useful properties of a superconductive material is that it exhibits no measurable electrical resistance below a certain critical temperature close to absolute zero.

Many of the electrical characteristics of a superconductive element are found to be critically dependent on the physical dimensions of the element. Heretofore, it has been found rather difficult to produce superconductive elements with the required dimensional precision to render feasible their use in computer applications.

Accordingly, it is an object of this invention to provide an improved method of fabricating thin-film metal elements with a high degree of dimensional precision.

A further object is to provide an improved method of forming superconductive elements with accurately controlled dimensional characteristics.

The foregoing and other objects are realized in a method comprising first preforming a surface layer of dielectric material on a substrate to produce a steep-sided surface depression corresponding to the desired size and shape of the wanted thin-film element. An apertured masking member is mounted adjacent to the preformed surface layer with the depression aligned with the aperture of the masking member. The aperture of the masking member also corresponds to the size and shape of the wanted thin-film element. The surface depression is then exposed to metal vapor from a source aligned with the aperture and depression to form a metal deposit in the depression having a thickness less than the depth of the depression. The deposite accurately defines the thin-film metal element.

Figures 1, 2, 3, 5:
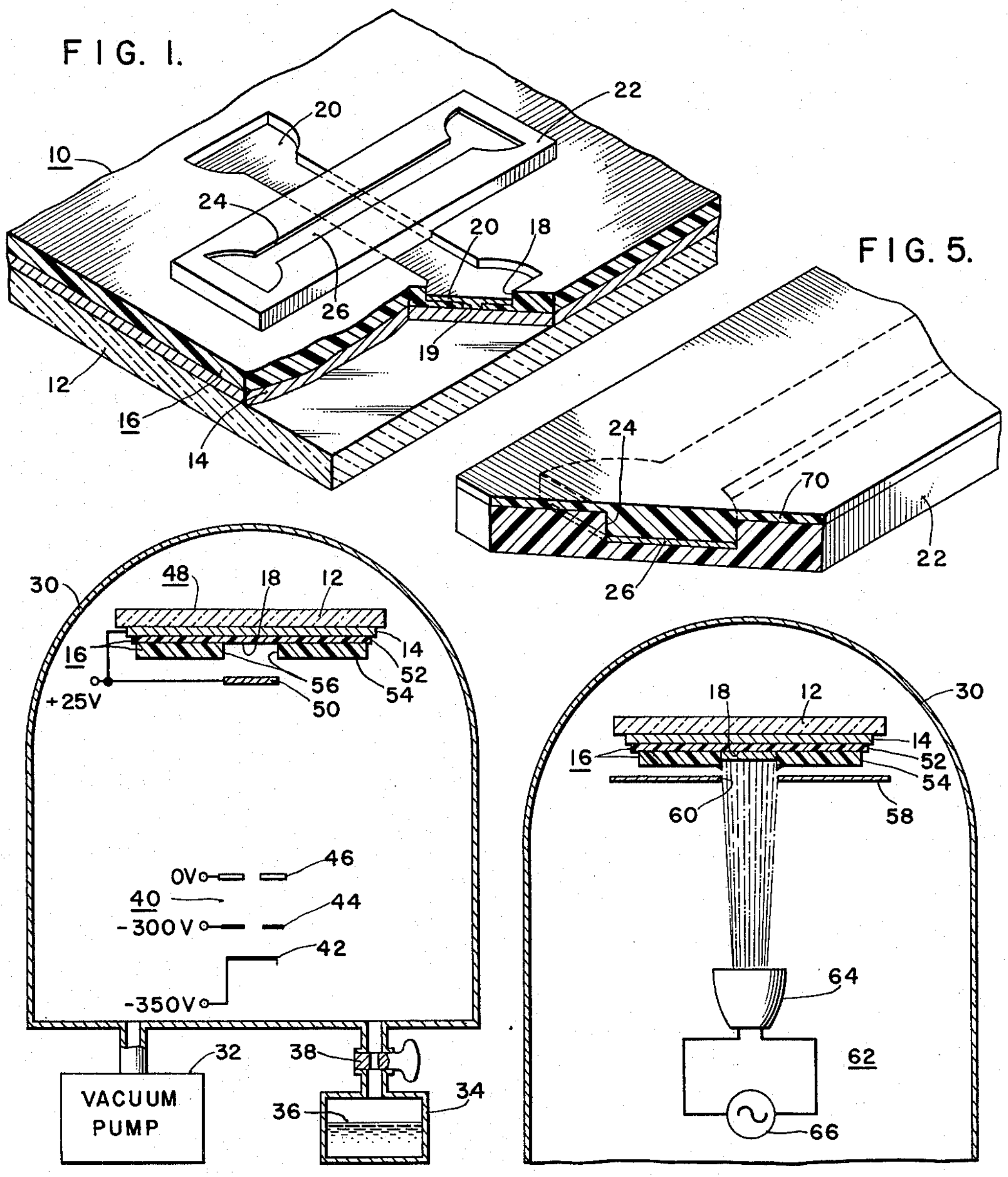
FIG. 1 is a perspective view of a superconductive gating device constructed in accordance with the method of the invention.
FIG. 2 is a diagrammatic view of one form of apparatus illustrating one step of the method of the invention.
FIG. 3 is a diagrammatic view of another apparatus illustrating another step of the method of the invention.
FIG. 5 is a perspective view, partly in section, showing a modified construction of a thin-film superconductive element according to the invention.
Figure 4:
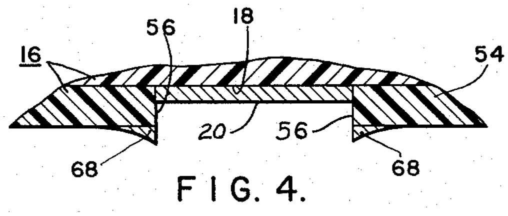
FIG. 4 is an enlarged sectional view of a portion of FIG. 3 showing in greater detail the construction of a thin-film metal element.

FIG. 1 shows a superconductive gating device 10 constructed from thin films, the fabrication of which is facilitated through the use of the method of the invention. Such a gating device and combinations thereof may be used to perform many of the well known logical functions in the computer art. For example, it may be used in the various ways described in U.S. Patent No. 2,832,897 granted to Dudley A. Buck.

The gating device 10 comprises an insulating substrate 12 coated with a superconducting coating 14, hereinafter referred to as a ground plane coating 14. The ground plane coating 14 serves primarily as an electrode during the coating process for maintaining the substrate at a desired electrical potential. In addition, the ground plane coating 14 serves as a common ground connection for other elements of the finished gating device 10. The ground plane coating 14 is coated with a first base layer 16 of dielectric material formed with an elongated depression 18 therein. There may also be provided at one end of the depression 18 an aperture 19 opening to the ground plane coating 14. The depression 18 is partially filled with a film of a first superconductive material forming an elongated thin-film superconductive gate element 20. The superconductive material also fills the aperture 19 to provide an electrical connection between the gate element 20 and the ground plane coating 14. A second base layer 22 of dielectric material, formed with an elongated depression 24 that is narrower than the depression 18 in the first base layer 16, is mounted across the gate element 20. The narrow depression 24 is partially filled with a film of a second superconductive material forming an elongated thin-film superconductive control element 26.

The gate element 20 and the control element 26 are preferably constructed of different superconductive materials, the material of the gate element 20 having a lower transition temperature for a given magnetic field, than does the material of the control element 26. The transition temperature is defined as the temperature at which a superconductive material changes its state between superconducting and resistive. As is well known, the transition temperature of a given superconductive material is a function of the magnetic field acting on the material, the transition temperature being reduced as the magnetic field is increased. It follows from this that a superconductive material operating under given conditions of temperature and magnetic field, can be transformed between superconducting and resistive states either by altering the applied magnetic field while maintaining a constant temperature, or by altering the temperature while maintaining a constant applied magnetic field, or by altering, in the same direction, both the temperature and the applied magnetic field.

In view of the foregoing principles, it can be seen that a current flowing through the gate element 20 can be controlled by passing a current through the control element 26. That is, while the gate element 20 is in a superconducting state, current can flow unimpeded therethrough. However, by applying a current to the control element 26, a sufficient magnetic field can be created about the control element 26 to act upon the gate element 20 in such a manner as to transform the gate element 20 to the resistive state, thereby blocking the gate current.

Certain electrical characteristics of superconductive elements, such as the gate element 20 and the control element 26 are critically dependent on their physical dimensions. For example, the maximum current that a superconducting element can carry before the self-induced magnetic field causes the element to go resistive is dependent upon the width of the element. Hence, in order to construct elements with predetermined electrical characteristics, it is necessary to precisely control their dimensional characteristics. According to the invention, the depressions 18 and 24 of the base layers 16 and 22 are utilized to define the dimensions of the gate element 20 and the control element 26.

For a more detailed description of the manner in which the method of the invention provides the desired dimensional control, reference is made to FIG. 2, which illustrates a vacuum deposition apparatus for carrying out the method. The vacuum deposition apparatus comprises a vacuum chamber 30 connected to a vacuum pump 32 for evacuating the chamber 30. A reservoir 34 holding a polymerizable liquid 36, such as a silicone oil, is connected to another part of the chamber 30 through a valve 38 which controls the flow of vapor of the polymerizable liquid 36 into the chamber 30. An electron gun 40 including a cathode 42, a control grid 44, and an accelerating anode 46, are mounted in the lower part of the chamber 30. The electron gun 40 is arranged to project a beam of electrons onto a subassembly 48 mounted in the upper part of the chamber 30.

The subassembly 48 may include that portion of the gating device 10 comprising the substrate 12, the ground plane coating 14, and the first base layer 16. A mask 50, conforming in length and width to the depression 18 in the first base layer 16, and mounted in front of the first base layer 16, completes the subassembly 48.

In the process of fabricating the gating device 10, the substrate 12, which may be made of glass or ceramic, is first cleansed of surface impurities as by immersion in an alcohol bath and then distilled water. The substrate 12 is next coated with the ground plane coating 14. The ground plane coating 14 is preferably formed from a high transition temperature superconductive material, such as lead, by well known vacuum deposition techniques. The coating process may be carried out in a vacuum chamber similar to the chamber 30, with the electron gun 40 being replaced by a container carrying a measured quantity of bulk lead and means for vaporizing the bulk lead. A vacuum of at least of the order of $10^{-5}$ millimeters of mercury has been found satisfactory to produce a uniform ground plane coating of lead.

The ground plane coated substrate 12 is then placed in the vacuum chamber 30 for the application of the first base layer 16. The base layer 16 is preferably applied in two steps by a procedure which comprises bombarding the ground plane coated substrate 12 with an electron beam passing thereto through an atmosphere of a polymerizable substance. According to this procedure, a vacuum of at least $1\times10^{-4}$ millimeters of mercury is established in the chamber 30. Next, vapors from the polymerizable liquid 36, such as a silicone oil, or a siloxane such as polydimethylsiloxane, are introduced into the chamber 30. This may be done by heating the liquid 36 to at least 100 degrees centigrade to vaporize the liquid until it reaches an equilibrium condition with the gases which remain in the vacuum system when the total vacuum pressure is $1\times10^{-4}$ millimeters of mercury or lower. At this time, the mask 50 is omitted from the chamber 30. The electron gun 40 is then turned on to subject the coated substrate 12 to electron bombardment. The energy of the electrons striking the coated surface of the substrate 12 has the effect of cross linking the vapor molecules of the silicone oil which have deposited on the substrate to form a continuous insulation film 52 constituting one portion of the first base layer 16.

With the anode 46 of the electron gun 40 maintained at zero or ground reference potential, it has been found that a satisfactory insulation film 52 can be formed by applying potentials of −300 volts to the control grid 44, −350 volts to the cathode 42, and +25 volts to the ground plane coating 14. The insulation film 52 is preferably made from 50 to 200 angstrom units in thickness, or thicker if desired.

The mask 50 is then placed next to the insulation film 52, and the same potential that is applied to the ground plane coating 14 is applied to the mask 50. The polymerization process is continued until the base layer 16 is built up by an additional thickness of from 1000 to 6000 angstrom units in the areas not covered by the mask 50. The build up in the thickness of the exposed areas of the base layer 16, illustrated by the thick layer portion 54, results in the formation of the depression 18 under the mask 50. The additional thickness which determines the depth of the depression 18 must be greater than the desired thickness of the gate element 20 to be formed. Under the voltage conditions specified, the thick layer portion 54 of the base layer 16 is formed with very sharp corners, and the sides 56 of the depression 18 are accordingly very steep.

The base layer 16 is now utilized as a mold for forming the gate element 20 with a high degree of precision. While it is preferred to use a vacuum evaporation method of forming the gate element 20, it is understood that other coating methods such as sputtering or the like may be used, involving the deposition of minute particles which may be as large as 100 to 1000 molecules in size or as small as a single molecule. To carry out this part of the process, the valve 38 is closed to block the entry of polymerizable vapor from the reservoir 34 into the chamber 30, and the vacuum pressure of the chamber 30 is lowered to at least $10^{-5}$ millimeters of mercury. Referring to FIG. 3, a second mask 58, which is the complement of the first mask 50, is substituted for the first mask 50. The second mask 58, which is provided with an opening 60 conforming to the size and shape of the depression 18, is mounted with a spacing of about .001 inch from the base layer 16, with the mask opening 60 aligned with the base layer depression 18. During this step of the process the voltage is removed from the ground plane coating 14.

The electron gun 40 is replaced by a source 62 of superconductive metal vapor, such as lead. The source 62 may include a container 64, such as a boat formed from tantalum ribbon or the like, which is used to hold the bulk lead metal. The boat 64 is connected across an electrical current source 66 which, by supplying a current through the boat 64, raises the temperature of the boat 64 and the lead therein to the vaporization temperature of the lead. By aligning the vapor source 62 with the mask opening 60 and the base layer depression 18, the vapor particles of lead issuing in a stream from the vapor source 62 are caused to impinge upon the bottom surface of the depression 18 substantially at right angles thereto. The evaporation process is carried out to form the gate element 20 with a desired thickness of lead coating which is less than the depth of the depression 18, with some of the vapor particles filling the aperture 19 in the base layer 16, as shown in FIG. 1.

While there is inevitably some scattering of the vapor particles that occurs around the periphery of the depression 18, any appreciable quantity of the scattered particles, shown in FIG. 5 as a deposit 68 which is tapered in thickness, will deposit preferentially outside of the depression 18 on surface areas of the base layer 16 which are substantially normal to the vapor stream, rather than on the steep sides 56 of the depression 18. Any deposit on the sides 56 of the depression 18 will be so light as to form a discontinuous, high resistance coating. The heavier deposit 68 which forms on the surface areas outside of the depression 18 is effectively isolated from the main deposit, on the bottom surface of the depression 18, which forms the gate element 20. Were it not for the depressed surface of the base layer 16, the scattered deposit 68 would merge with the main deposit to form an element having dimensions greater than those desired. Accordingly, the lateral boundaries of the gate element 20 are precisely defined by the steep sides 56 of the depression 18.

After the gate element 20 is formed, the depression 18 may be filled at least in the central portion thereof with dielectric material to provide a smooth foundation for the reception of the second base layer 22 and the control element 26. The dielectric filling may be accomplished by electron beam polymerization with the use of a mask similar to the second mask 58 used to deposit the gate element 20. Then in a similar manner as described above, the second base layer 22 is formed by electron beam polymerization to produce a mold for depositing the control element 26 in the second depression 24.

It should be noted that since the two masks 50 and 58 are complements of each other, their fabrication with the desired dimensions may be facilitated by using one mask as a mold for forming the other mask by a casting process. Where it is desired to use a plastic for the casting material, the plastic casting may be coated with a thin metal film, if it is necessary that the mask be electrically conductive.

Another advantage results from the use of the invention in connection with the fabrication of superconductive elements made of mercury. While mercury is in the solid state when maintained below its superconductive transition temperature of 4.1 degrees Kelvin, it may be necessary that it be handled, during and after fabrication, at or close to room temperature, which is considerably above its liquification temperature of −40° centigrade. Thus, there arises the problem of maintaining the conformation of the elements while the mercury is in the fluid state. This problem is avoided by having the base layer serve as a container for the fluid material. For example, if the control element 26 is made of mercury, it may be formed by the above described process, except that during the metal evaporation step the base layer 22 and the other component parts supported by the substrate 12 are maintained at a reduced temperature below the liquification temperature of mercury. This may be accomplished by mounting the substrate in thermal contact with a metal container holding a quantity of liquid nitrogen, for example. The mercury will deposit in the depression 24 in solid form. Thereafter, while the mercury deposit is held at reduced temperature, the mercury element is sealed in the depression, as shown in FIG. 5, by the application of a cover coat 70 filling the remainder of the depression 24 and bonded to the top surface of the base layer 22. Should the mercury control element 26 later turn liquid, its shape remains fixed by encapsulation within the depression 24.

It is now apparent that thin-film metal elements, such as superconductive elements and the like, can be fabricated with a high degree of dimensional precision by means of the invention.

What is claimed is:

1. A method of fabricating a thin-film metal element of predetermined size and shape on a substrate, said method comprising: depositing on said substrate by electron beam polymerization a layer of dielectric material formed with at least one steep-sided depression corresponding in size and shape to said metal element, placing an apertured masking member adjacent to said dielectric layer with said depression aligned with an aperture of said member, said aperture also being formed to correspond in size and shape to said metal element, and vacuum evaporating metal through said aperture from a source in substantial alignment with said depression and said aperture to form in said depression a metal deposit of a thickness less than the depth of said depression, said deposit being continuous only in the bottom of said depression.

2. A method of fabricating a thin-film metal element of predetermined size and shape on a substrate, said method comprising: depositing a uniform film of dielectric material on said substrate, masking a surface area of said dielectric film conforming to said predetermined size and shape of said metal element while exposing surrounding surface area to electron beam bombardment in the presence of a polymerizable vapor, to form a relatively thick composite dielectric layer with said masked area recessed therein, masking the surface areas of said composite dielectric layer exclusive of said recessed area, and exposing said recessed area to a stream of metal particles in vacuum to produce a continuous coating of metal substantially only on said recessed area, said coating being deposited to a thickness which is less than the distance of said recessed area below the surface of said composite dielectric layer.

3. A method of fabricating a thin-film metal element of predetermined size and shape on a substrate, said method comprising: applying an electrically conductive coating on said substrate, placing said coated substrate within a vacuum chamber in an atmosphere of a polymerizable vapor, arranging said conductive coating in electron beam intercepting relation with an electron gun, subjecting said conductive coating to electron bombardment from said electron gun while maintaining said coating at a positive potential relative to said electron gun to form a uniform dielectric film on said conductive coating, mounting a first mask conforming to said predetermined size and shape of said metal element intermediate said electron gun and said dielectric film, subjecting said dielectric film to electron bombardment from said electron gun while maintaining said first mask and said conductive coating at a positive potential relative to said electron gun, to deposit on said dielectric film a relatively thick dielectric layer formed with a depression therein conforming to said predetermined size and shape of said metal element, and exposing said depression to a stream of metal particles from a vapor source within said vacuum chamber through a second mask provided with an aperture therein conforming in size and shape to said metal element, with said vapor source, said aperture and said depression substantially in alignment, to form a metal deposit in said depression of a thickness less than the depth of said depression.

4. A method of fabricating a thin-film metal element of predetermined size and shape on a substrate, said method comprising: applying an electrically conductive coating on said substrate, depositing a uniform dielectric film on said conductive coating, mounting a first mask conforming to said predetermined size and shape of said metal element adjacent to said dielectric film, subjecting said dielectric film to electron bombardment from an electron gun in the presence of a polymerizable vapor while maintaining said first mask and said conductive coating at a positive potential relative to said electron gun, to deposit on said dielectric film a relatively thick dielectric layer formed with a depression therein conforming to said predetermined size and shape of said metal element, and exposing said depression to a stream of metal particles in vacuum from a source of metal vapor through a second mask provided with an aperture therein conforming in size and shape to said metal element, with said vapor source, said aperture and said depression substantially in alignment to form a metal deposit in said depression of a thickness less than the depth of said depression.

5. A method of fabricating a thin-film metal element of predetermined size and shape on a substrate, said method comprising: applying an electrically conductive coating on said substrate, depositing a uniform dielectric film on said conductive coating, mounting a mask conforming to said predetermined size and shape of said metal element adjacent to said dielectric film, subjecting said dielectric film to electron bombardment from an electron gun in the presence of a polymerizable vapor while maintaining said first mask and said conductive coating at a positive potential relative to said electron gun, to deposit on said dielectric film a relatively thick dielectric layer formed with a depression therein conforming to said predetermined size and shape of said metal element, and forming by vacuum evaporation a metal deposit in said depression of a thickness less than the depth of said depression.

6. A method of fabricating a thin-film metal element of predetermined size and shape on a substrate, said method comprising: applying an electrically conductive coating on said substrate, depositing a uniform dielectric film on said conductive coating, mounting a first mask conforming to said predetermined size and shape of said metal element adjacent to said dielectric film, subjecting said dielectric film to electron bombardment from an electron gun in the presence of a polymerizable vapor while maintaining said first mask and said conductive coating at a positive potential relative to said electron gun, to deposit on said dielectric film a relatively thick dielectric layer formed with a depression therein conforming to said predetermined size and shape of said metal element, with the side surfaces of said depression extending substantially at right angles to the plane of said substrate, and exposing said depression to a source of metal vapor in vacuum to form a metal deposit in said depression of a thickness less than the depth of said depression, said deposit being continuous only in the bottom of said depression.

7. A method of fabricating a thin-film metal element of predetermined size and shape on a substrate, said method comprising: bombarding said substrate with electrons in the presence of a silicone oil to form a layer of dielectric material formed with at least one steep-sided depression corresponding in size and shape to said metal element, placing an apertured masking member adjacent to said dielectric layer with said depression aligned with an aperture of said member, said aperture also being formed to correspond in size and shape to said metal element, and vacuum evaporating metal vapor through said aperture from a source in substantial alignment with said depression and said aperture to form in said depression a deposit of a thickness less than the depth of said depression, said deposit being continuous only in the bottom of said depression.

8. The method according to claim 7 wherein said substrate is maintained within an atmosphere of less than about $1\times10^{-4}$ millimeters of mercury during electron bombardment.

9. A method of fabricating a thin-film metal element of predetermined size and shape on a substrate, said method comprising: applying on said substrate by electron beam polymerization a layer of dielectric material formed with at least one steep-sided depression corresponding in size and shape to said metal element, placing an apertured masking member adjacent to said dielectric layer with said depression aligned with an aperture of said member, said aperture also being formed to correspond in size and shape to said metal element, vacuum depositing metal vapor in said depression from a source in substantial alignment with said depression and said aperture to form a continuous deposit of a thickness less than the depth of said depression, and filling the remainder of said depression with dielectric material to encapsulate said deposit.

10. A method of fabricating a thin film element of predetermined size and shape and formed from a metal having a predetermined liquification temperature below 20° centigrade, said method comprising: applying on a substrate by electron beam polymerization a layer of dielectric material formed with a steep-sided depression corresponding in size and shape to said metal element, placing an apertured masking member adjacent to said dielectric layer with said depression aligned with an aperture of said member, said aperture also being formed to correspond in size and shape to said metal element, vacuum depositing vapor of said metal in said depression from a source in substantial alignment with said depression and said aperture while maintaining said dielectric layer at a reduced temperature below the liquification temperature of said metal to form a continuous deposit of a thickness less than the depth of said depression, and while maintaining said metal in the solid state filling the remainder of said depression with dielectric material to encapsulate said deposit.

11. The method according to claim 10 wherein said metal element is formed from mercury and said dielectric layer is formed from a polymerized silicone oil.

References Cited in the file of this patent

UNITED STATES PATENTS

| | | |
|---|---|---|
| 2,848,359 | Talmey | Aug. 19, 1958 |
| 2,898,241 | Charlton et al. | Aug. 4, 1959 |
| 2,921,006 | Schmitz et al. | Jan. 12, 1960 |
| 2,932,591 | Goodman | Apr. 12, 1960 |
| 2,936,435 | Buck | May 10, 1960 |
| 2,937,351 | Craig | May 17, 1960 |